US009943938B2

(12) United States Patent
Collis et al.

(10) Patent No.: US 9,943,938 B2
(45) Date of Patent: Apr. 17, 2018

(54) METHOD AND APPARATUS FOR MAKING A FRICTION PLATE

(71) Applicant: BorgWarner Inc., Auburn Hills, MI (US)

(72) Inventors: Dean A. Collis, Wheaton, IL (US); Walter J. Becker, Palatine, IL (US)

(73) Assignee: BorgWarner Inc., Auburn Hills, MI (US)

( * ) Notice: Subject to any disclaimer, the term of this patent is extended or adjusted under 35 U.S.C. 154(b) by 983 days.

(21) Appl. No.: 14/360,976

(22) PCT Filed: Nov. 30, 2012

(86) PCT No.: PCT/US2012/067194
§ 371 (c)(1),
(2) Date: May 28, 2014

(87) PCT Pub. No.: WO2013/085806
PCT Pub. Date: Jun. 13, 2013

(65) Prior Publication Data
US 2014/0290845 A1  Oct. 2, 2014

Related U.S. Application Data

(60) Provisional application No. 61/568,930, filed on Dec. 9, 2011.

(51) Int. Cl.
B29C 65/48 (2006.01)
B32B 37/12 (2006.01)
(Continued)

(52) U.S. Cl.
CPC ............. B23P 23/04 (2013.01); B23P 15/18 (2013.01); B23P 19/02 (2013.01); B26F 1/384 (2013.01);
(Continued)

(58) Field of Classification Search
USPC ............... 156/249, 250, 256, 258, 261, 267
See application file for complete search history.

(56) References Cited

U.S. PATENT DOCUMENTS 4,596,541 A * 6/1986 Ward, Sr. ............... B26D 3/085
493/354
5,571,372 A * 11/1996 Miyaishi ............. F16D 69/0408
156/251

(Continued)

FOREIGN PATENT DOCUMENTS

CN    1093445 A    10/1994
CN    101086286 A  12/2007
(Continued)

OTHER PUBLICATIONS

Chinese Office Action dated Oct. 10, 2015 ;Application No. 201280058309.5 ; Applicant: Borgwarner Inc.; 21 pages.
PCT/US2012/067194 Search Report and Written Opinion, dated Feb. 26, 2013, 9 pages.

Primary Examiner — Sing P Chan
(74) Attorney, Agent, or Firm — BrooksGroup

(57) ABSTRACT

A method for making a friction plate that includes a core plate and a friction facing is disclosed. The method includes cutting a pattern of friction material segments into a friction material sheet such that each friction material segment remains integrally connected to the friction material sheet, locating a predetermined number of the friction material segments adjacent to a surface of a core plate to which a bonding material is present, separating the friction material segments from the friction material sheet, and placing the friction material segments onto the surface of the core plate over the bonding material. An apparatus for practicing this method is also disclosed.

15 Claims, 6 Drawing Sheets

(51) Int. Cl.

| | |
|---|---|
| *B32B 38/04* | (2006.01) |
| *B32B 43/00* | (2006.01) |
| *B23P 23/04* | (2006.01) |
| *B23P 15/18* | (2006.01) |
| *B26F 1/38* | (2006.01) |
| *F16D 65/12* | (2006.01) |
| *B23P 19/02* | (2006.01) |
| *F16D 65/00* | (2006.01) |
| *F16D 69/04* | (2006.01) |

(52) U.S. Cl.
CPC ........... *F16D 65/00* (2013.01); *F16D 65/127* (2013.01); *F16D 69/0408* (2013.01); *F16D 2250/00* (2013.01); *F16D 2250/0061* (2013.01); *F16D 2250/0069* (2013.01); *Y10T 156/107* (2015.01); *Y10T 156/1304* (2015.01)

(56) References Cited

U.S. PATENT DOCUMENTS

| | | |
|---|---|---|
| 5,897,737 A | 4/1999 | Quigley |
| 6,019,205 A | 2/2000 | Willwerth et al. |
| 6,790,308 B2 | 9/2004 | Murphy et al. |
| 6,939,427 B1 | 9/2005 | Anma et al. |
| 2005/0015954 A1 | 1/2005 | Wakamori |
| 2005/0133332 A1 | 6/2005 | Oguri et al. |

FOREIGN PATENT DOCUMENTS

| | | |
|---|---|---|
| CN | 101375075 A | 2/2009 |
| EP | 0583516 A1 | 2/1994 |

\* cited by examiner

METHOD AND APPARATUS FOR MAKING A FRICTION PLATE

This application claims the benefit of U.S. Provisional Application Ser. No. 61/568,930 filed Dec. 9, 2011.

TECHNICAL FIELD

The technical field of this disclosure relates generally to an apparatus and method for making a friction plate for use in a wet clutch mechanism or a wet brake mechanism incorporated into, for example, a vehicle transmission or other lubricated vehicle component.

BACKGROUND

A motor vehicle may employ a wet clutch mechanism and/or a wet brake mechanism to help govern operation of the vehicle. Several components within a vehicle powertrain, for instance, may employ a wet clutch mechanism to facilitate the transfer of power from the vehicle's power generator (i.e, an internal combustion engine, electric motor, fuel cell, etc.) to the drive wheels. A transmission located downstream from the power generator which enables vehicle launch, gear shifting, and other torque transfer events is one such component. Some form of a wet clutch mechanism may be found throughout many different types of transmissions currently available for motor vehicle operation. A multi-plate wet clutch pack for an automatic transmission, a continuously variable transmission (CVT), or a dual-clutch transmission (DCT) is one particular example. Other types of wet clutch mechanisms may also be found in the transmission or elsewhere in the vehicle powertrain such as, for example, in a transfer case or an all-wheel drive unit. A wet brake mechanism functions and operates similar to a wet clutch mechanism but is used within the vehicle braking system to slow, stop, or otherwise restrict rotation of the drive wheels.

A typical multi-plate wet clutch pack (for a wet clutch or a wet brake mechanism) includes a set of friction plates and a set of reaction plates in which the two sets of plates are interleaved in coaxial facing alignment. The friction plates are typically comprised of an annular core plate and a friction facing bonded to one, and usually both, of the opposed annular working surfaces of the core plate. The friction facing may include a plurality of friction material segments situated around the core plate so that radially-extending channels are defined between pairs of adjacent segments. The reaction plates are constructed similarly to the friction plates but without the friction facing. Each set of plates is splined at an inner or outer circumferential edge to independent yet proximally situated support members. The friction plates and the reaction plates can be routinely engaged—or squeezed together—in the presence of a lubricant fluid to selectively to effectuate a torque transfer event or a braking event. Such recurring engagement and disengagement of the friction plates with their neighboring reaction plates is facilitated by the annularly-disposed friction facing present on the friction plates.

The manufacture of a friction plate generally involves deriving the individual friction material segments from a friction material source, such as a roll of friction material sheet stock, and then bonding them to one or both surfaces of the core plate to form the friction facing. A wide variety of approaches that present differing levels of manufacturing complexity and cost structure and, in some instances, friction facing performance, have been devised for making a friction plate. Nevertheless, the development of methods and apparatuses that can easily, reliably, and flexibly make friction plates with well-performing friction facings is constantly being pursued.

SUMMARY OF THE DISCLOSURE

A method for making a friction plate may include (a) cutting a pattern of friction material segments into a friction material sheet such that each friction material segment remains integrally connected to the friction material sheet by at least one tie, (b) locating a predetermined number of the friction material segments adjacent to a surface of a core plate to which a bonding material is present, (c) separating the predetermined number of friction material segments from the friction material sheet, and (d) placing the predetermined number of friction material segments onto the surface of the core plate over the bonding material. An apparatus for practicing this method is also disclosed.

BRIEF DESCRIPTION OF THE DRAWINGS

Exemplary embodiments of the present disclosure are described below in the detailed description in conjunction with the accompanying drawings, in which like numerals denote like elements, and wherein:

FIG. 2 is a side elevation view of the apparatus. FIG. 3 is a top plan view of the apparatus. FIG. 4 is a partial perspective view of the apparatus showing the rotary die cutting assembly, the locator punch assembly, and a portion of the core plate indexing assembly. FIG. 5 is a partial top plan view of the apparatus showing the rotary die assembly and the locator punch assembly. And FIG. 6 is a partial cross-sectional view of the apparatus showing the rotary die cutting assembly and locator punch assembly looking back from the core plate indexing assembly.

DETAILED DESCRIPTION

Figure 1:
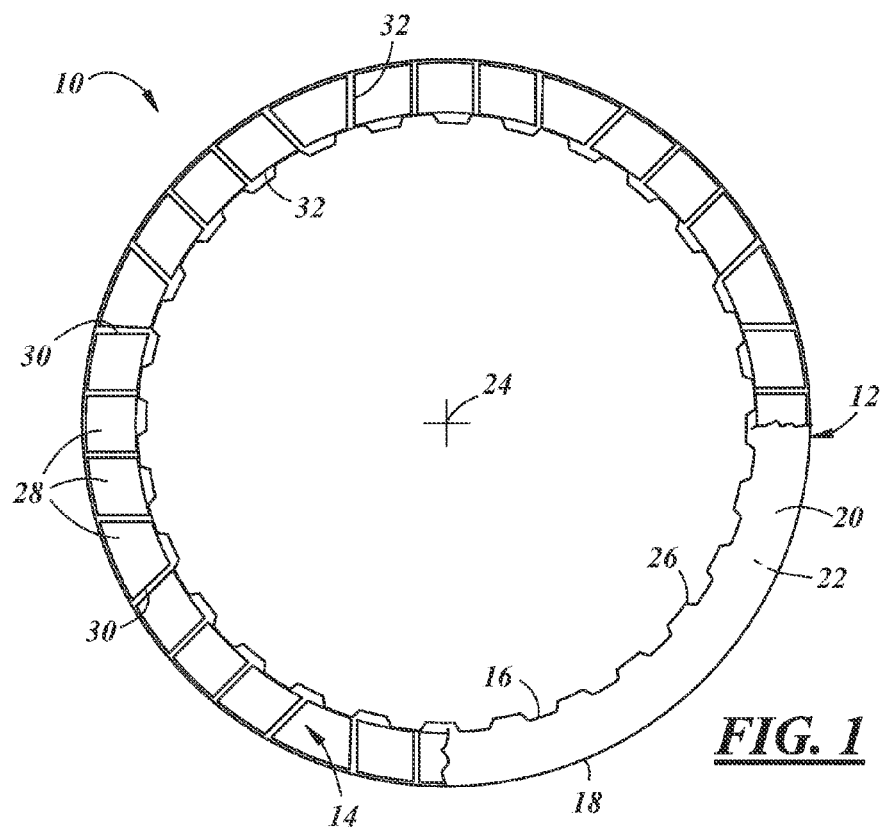
FIG. 1 is a generalized illustration of a friction plate for use in a wet clutch mechanism. The friction plate shown here includes a core plate and a friction facing bonded to the core plate. The friction facing is formed from a plurality of friction material segments.

A method and apparatus for making a friction plate and, if desired, many friction plates one after another, is disclosed. A generalized illustration of a friction plate 10 is shown in FIG. 1. The friction plate 10 includes a core plate 12 and at least one friction facing 14. The core plate 12 has an inner circumferential edge 16 and an outer circumferential edge 18 that, together, define a pair of axially-facing annular surfaces 20, 22 relative to a central rotational axis 24. The friction facing 14 illustrated here is bonded to one of the annular surfaces 20 by a bonding material such as, for example, a cured thermosetting phenolic resin, but of course a similar friction facing 14 may also be present on the other annular surface 22. A series of circumferentially spaced teeth 26 may be integrally formed on either the inner circumferential edge 16, as shown, or the outer circumferential edge 18 to facilitate splined engagement between the friction plate 10 and a suitable fixed or rotatable support member (i.e., a shaft, hub, housing, etc.). Many different types of rigid materials may be used to construct the core plate 12. A few suitable materials include steel, aluminum, and various plastics, to name but a few examples.

The friction facing 14 may include, as shown, multiple friction material segments 28 bonded annularly around at least one of the annular surfaces 20, 22. Each adjacent pair of friction material segments 28 may define a radial channel 30 to permit the multi-directional passage of a lubricant fluid through the friction facing 14 during use of the friction plate 10 in a wet clutch or wet brake mechanism. This type of lubricant fluid flow helps lubricate the friction facing 14 and cool the friction plate 10 in opposition to the heat generated by the compressive and frictional surface interactions encountered during repeated engagement and disengagement of the friction facing 14 with an opposed surface of, for example, a facially and co-axially aligned reaction plate. Anywhere from 3 to 192 of the friction material segments 28 may be employed to constitute the friction facing 14. The several friction material segments 28, moreover, may have similar or differing shapes despite what is explicitly shown in the generalized illustration of the friction plate 10, as is further detailed below. The friction facing 14 may be derived from any suitable friction material known or available to skilled artisans. One exemplary friction material often used is an aramid fiber based paper impregnated with a phenolic resin.

Each of the friction material segments 28 includes an edge 32 that defines its shape. Certain performance-related effects can be realized in the functionality of the friction plate 10 and the operation of the wet clutch/brake mechanism if that edge 32 is cleanly scour cut. A well-defined, precisely cut edge limits contamination of the lubricant fluid by dislodged friction material particles, enhances the separation quality of the friction facing 14 during disengagement (i.e., the ability to quickly break and separate from an engaged surface without sticking) and, perhaps most notably, permits the lubricant fluid to flow through the radial channels 30 with minimal obstruction. The more efficient flow of lubricant fluid through the friction facing 14 is laudable because it reduces drag torque associated with rotation of the friction plate 10. And any reduction in the drag torque experienced by the friction plate 10 during use, which is a parasitic energy loss, can contribute to improved fuel economy in a wet clutch or wet brake mechanism incorporated into motor vehicle applications.

An exemplary embodiment of the method and apparatus for making the friction plate 10, and many variations of the friction plate 10, is described with reference to FIGS. 2-6. The method and apparatus can provide the friction material segments 28 with edges 32 that are cleanly scour cut—as opposed to torn or sheared—around a large majority of the friction material segments 28 included in the friction facing 14. The friction material segments 28 can have the same or different shape profiles within the friction facing 14 and their placement onto the annular surface or surfaces 20, 22 of the core plate 12 is subject to tightly controlled precision. Reference is made in FIGS. 2-6 to the generalized and representative friction plate 10 shown in FIG. 1, and its various parts (i.e., core plate 12, friction facing 14, friction material segments 28, etc.), for purposes of aiding in the description of the method and apparatus discussed. The disclosed method and apparatus are, of course, not limited to fabrication of only the friction plate 10, but are instead amenable to fabrication of many different friction plate designs and constructions.

The method of making the friction plate 10 involves, generally speaking, cutting a pattern of the friction material segments 28 into a friction material sheet. The friction material segments 28, however, are not entirely severed from the friction material sheet; rather, they remain integrally connected to the friction material sheet by at least one tie of the friction material. Based on product design, a predetermined number of the friction material segments 28 is then located adjacent to the annular surface 20 of the core plate 12, separated from the friction material sheet, and then placed onto the annular surface 20 of the core plate 12 over a previously-applied bonding material. The core plate 12 may then be rotated and the process repeated until an arrangement of the friction material segments 28 is placed around the annular surface 20. The annular surface denoted by numeral 20 has been arbitrarily chosen to accommodate the current description of the method and apparatus in which the friction material segments 28 are placed onto one of the annular surfaces 20, 22 of the core plate 12 at a time. The same disclosure holds true for the other, oppositely facing annular surface 22 of the core plate 12 as well.

The apparatus 50 shown in FIGS. 2-6 is one example of an apparatus that is able to practice this method of making the friction plate 10. The apparatus 50 includes a rotary die cutting assembly 52, a locator punch assembly 54, and a core plate indexing assembly 56. A friction material sheet 58 may be fed from a roller or other source (not shown) through the rotary die cutting assembly 52 in a forward direction F and towards the locator punch assembly 54. A track 60 may direct the friction material sheet 58, after emergence from the locator punch assembly 54, away from the locator punch assembly 54 and the core plate indexing assembly 56 and eventually to a vacuum chute or rewinder (not shown) for scrap friction material sheet collection. As the friction material sheet 58 passes through the apparatus 50, the various assemblies 52, 54, 56 cooperatively operate to cut the friction material segments 28 from the friction material sheet 58 and repeatedly place a predetermined number of those segments 28 circumferentially around the annular surface 20 of the core plate 12 over the bonding material. The friction material segments 28 may be permanently bonded to the annular surface 20 to form the friction facing 14 either within the apparatus 50 or apart from the apparatus 50 depending on, for instance, manufacturing constraints or simple design choice. Variations of this apparatus 50, or a different apparatus altogether, may also be used to carry out the disclosed method according to the knowledge and technical capabilities of skilled artisans.

The rotary die cutting assembly 52 includes a rotary die cutting roller 62 and an anvil roller 64 housed in a frame 66. These rollers 62, 64 are configured to cooperatively rotate against one another in opposite rotational directions. The rotary die cutting roller 62 has a cutting surface 68 (shown best in FIG. 6) that, during coordinated rotation of the rotary die cutting roller 62 and the anvil roller 64, repeatedly cuts a pattern 70 of the friction material segments 28 into the friction material sheet 58 as the sheet 58 passes between the rotary die cutting roller 62 and the anvil roller 64 while moving in the forward direction F. The pattern 70 of the friction material segments 28 may, in one embodiment, group a predetermined number of the friction material segments 28 into a friction material segment set 72 (shown best in FIGS. 4 and 5) that is formed over and over again in succession as the friction material sheet 58 advances through the rotary die cutting assembly 52. And as further explained below, each friction material segment set 72 may be placed onto the annular surface 20 of the core plate 12 per indexed rotation of the core plate 12 by the core plate indexing assembly 56; that is, one friction material segment set 72 may be placed, then the core plate 12 is rotated, then another friction material segment set 72 may be placed, followed by another rotation of the core plate 12, and so on until the core plate 12 completes one full rotation.

The cutting surface 68 of the rotary die cutting roller 62 encompasses sharp cutting elements 74 capable of perforating clean, scour-cut, defining edges 32 of the friction material segments 28 into the friction material sheet 58. The sharp cutting elements 74 may be blades with beveled or wedged knife edges or some other suitable cutting device. The sharp cutting elements 74 are constructed so that the friction material segments 28 cut into the friction material sheet 58 are not completely severed from the sheet 58. Instead, each of the friction material segments 28 remains integrally connected to the friction material sheet 58 by at least one tie 76 (shown generally in FIGS. 4 and 5 and in specific embodiments in FIGS. 7 to 11). This may be accomplished by incorporating voids or gaps into the sharp cutting elements 74 at locations where the ties 76 are meant to be formed. The one or more ties 76 that keep each friction material segment 28 connected to the friction material sheet 58 are generally quite small to ensure as much of the edges 32 defining the friction material segments 28 are cleanly cut. In most instances, the ties 76 account for less than about 5%, and typically less than about 2%, of the edge 32 of each cut friction material segment 28; that is, at least 95% and usually at least 98%, but not 100%, of the edge 32 of each the friction material segment 28 is severed from the friction material sheet 58 after the friction material sheet 58 emerges from the rotary die cutting assembly 52.

The sharp cutting elements 74 may assume a variety of arrangements depending on the desired spatial and geometrical specifications of the pattern 70 of friction material segments 28 intended to be cut into the friction material sheet 58. For instance, FIGS. 7-11 respectively show several different exemplary die cuts 700, 800, 900, 1000, 1100 that may be cut into the friction material sheet 58 by the cutting surface 68 as the rotary die cutting roller 62 rotates. A die cut is an industry term that refers to the pattern 70 cut into the advancing friction material sheet 58 when viewed from an overhead perspective looking down on the sheet 58 as it emerges from the rotary die cutting assembly 52. The die cut 700 shown in FIG. 7 includes a friction material segment set 772 that is repeatedly formed one after another as the friction material sheet 758 passes through the rotary die cutting assembly 52 in the forward direction F. The die cuts 800, 900, 1000, 1100 shown in FIGS. 8 through 11, respectively, are similar to the die cut 700 shown in FIG. 7 with the only differences being the number of friction material segments 728, 828, 928, 1028, 1128 in the friction material segment set 772, 872, 972, 1072, 1172 and the shape profile of the friction material segments 728, 828, 928, 1028, 1128. Like numerals have been used throughout FIGS. 1-11 to designate like features.

Figure 7:
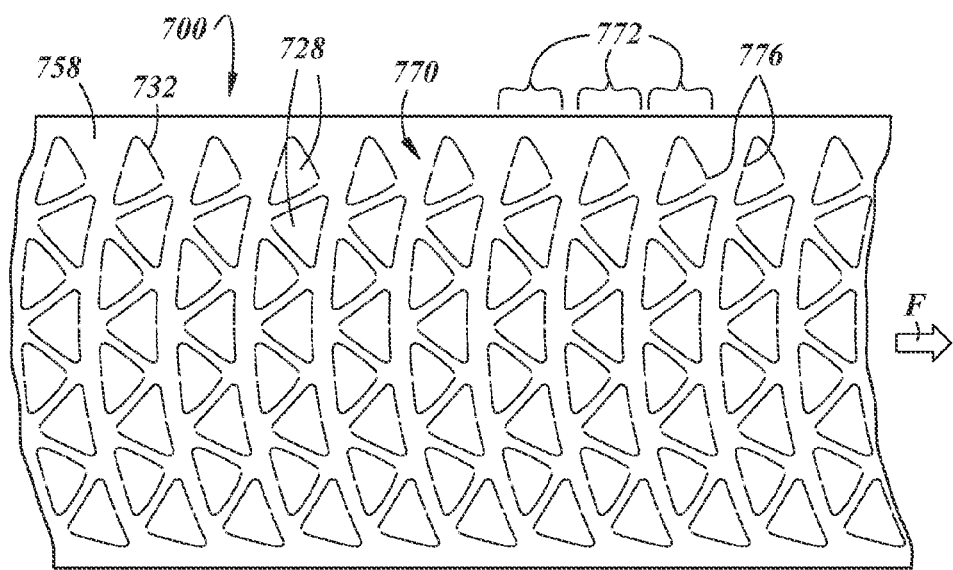
FIGS. 7-11 depict several different die lines that can be cut into a friction material sheet passing through the rotary die cutting assembly shown in FIGS. 2-6. A die line is an industry term that refers to the pattern cut into the friction sheet as viewed from an overhead perspective looking down on the friction material sheet as it emerges from the rotary die assembly.
Figure 8:
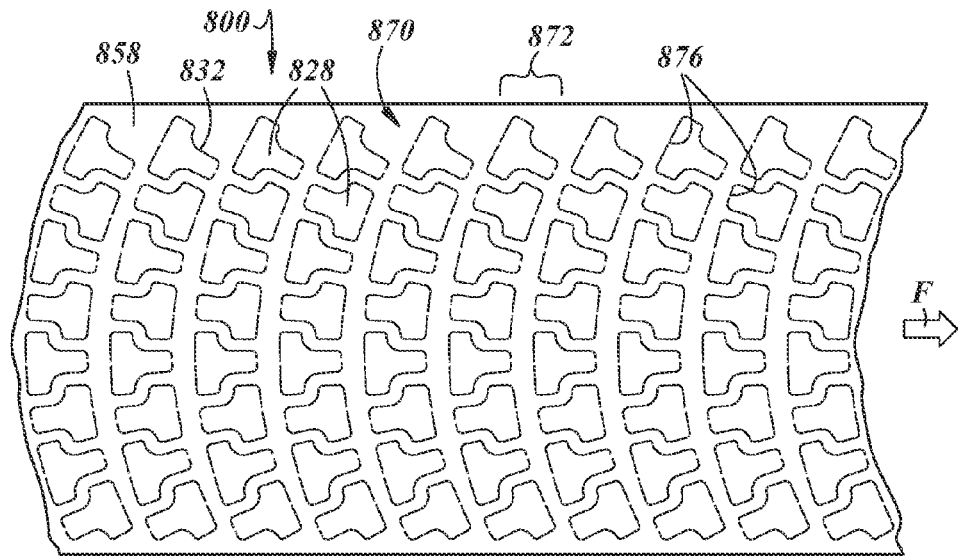
Figure 9:
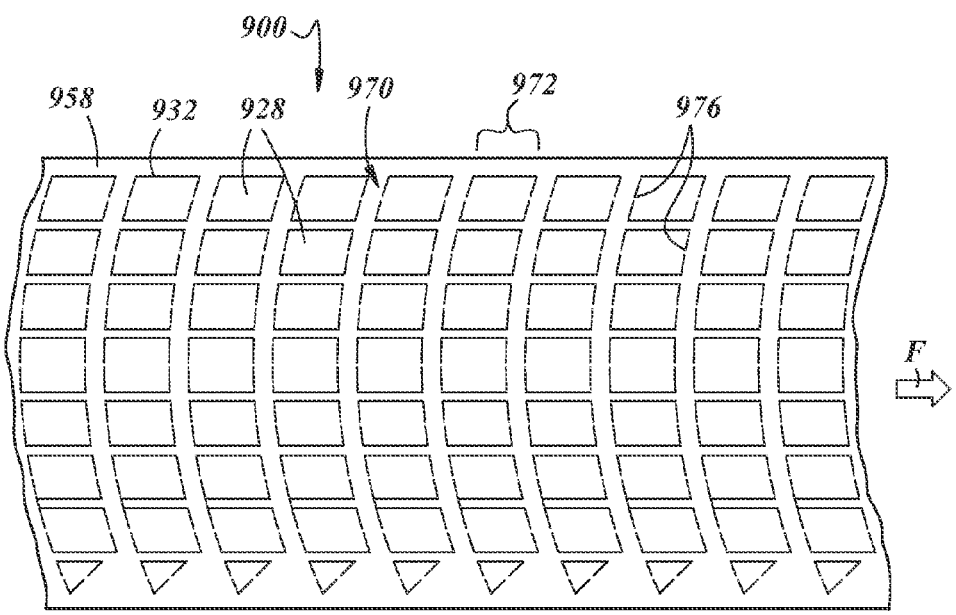
Figure 10:
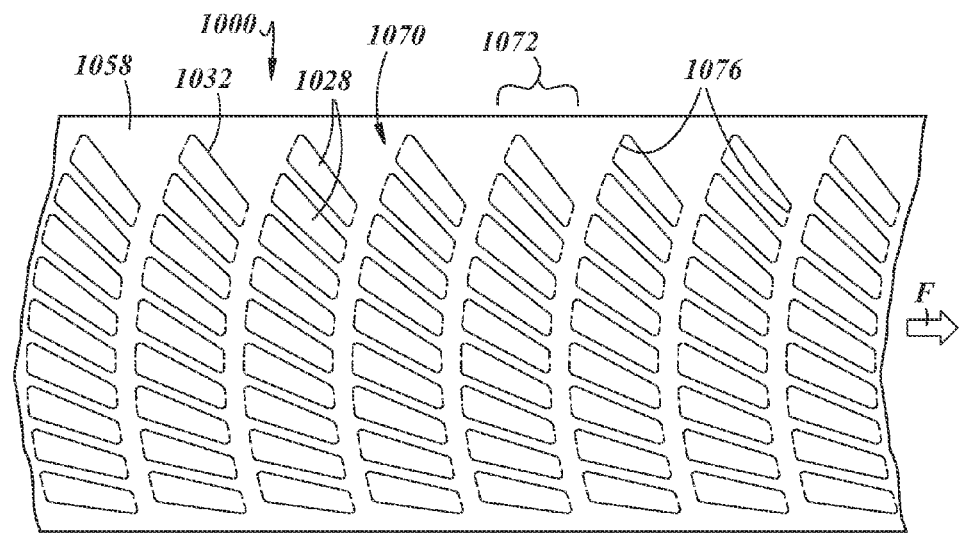
Figure 11:
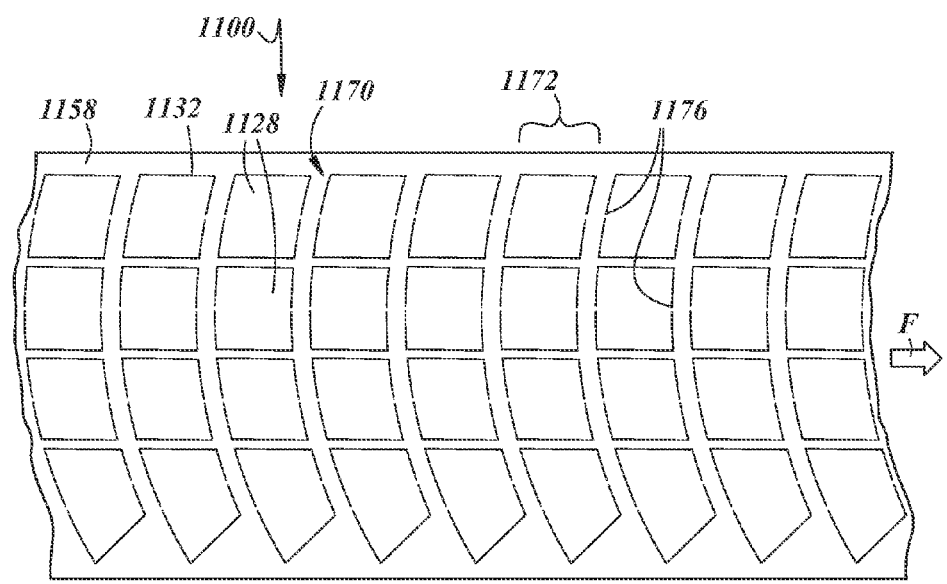

Each friction material segment set 772 in the die cut 700 shown in FIG. 7 comprises a predetermined number of alternately-oriented triangular friction material segments 728—in this case eight of them—and extends generally perpendicular to the forward direction F in a slightly arcuate contour. Two ties 776 integrally connect each friction material segment 728 to the friction material sheet 758. The ties 676 may be present, as shown, at locations on the friction material segments 628 that are situated, within the construct of the friction facing 14, proximate the inner and outer circumferential edges 16, 18 of the core plate 12 and not within the radial channels 30. This placement of the ties 676 helps ensure the edges 732 of the friction material segments 728 that define the radial channels 30 are as cleanly scour cut as possible. The friction material segment sets 872, 972, 1072, 1172 shown in FIGS. 8 through 11 exemplify a variety of other patterns 870, 970, 1070, 1170 of friction material segments 828, 928, 1028, 1128 that can be cut by the rotary die cutting assembly 52. Similar to the die cut 700 shown in FIG. 7, two ties 876, 976, 1076, 1176 integrally connect each of the friction material segments 828, 928, 1028, 1128 to the friction material sheet 858, 958, 1058, 1158 at locations that are, within the construct of the friction facing 14, proximate the inner and outer circumferential edges 16, 18 of the core plate 12 and not within the radial channels 30. The ties 776, 876, 976, 1076, 1176, of course, may be located elsewhere on the friction material segments 728, 828, 928, 1028, 1128 and more than two ties 776, 876, 976, 1076, 1176 may be employed to integrally connect each friction material segment 728, 828, 928, 1028, 1128 to the friction material sheet 758, 858, 958, 1058, 1158 if desired.

The rotary die cutting roller 62 and the anvil roller 64 may be controllably rotated in sync by any suitable approach to satisfy indexing requirements at the locator punch assembly 54 and the core plate indexing assembly 56. For example, the anvil roller 64 may be rotated at a desired rate of rotation by a servo-mechanically driven shaft 78 that extends through the anvil roller 64 along its axis of rotation. Coordinated rotation of the rotary die cutting roller 62 and the anvil roller 64 may be achieved by the meshed engagement of rotatably aligned gear teeth 80, 82 integrally formed at a peripheral edge of both the rotary die cutting roller 62 and the anvil roller 64, respectively. Moreover, to keep the rotary die cutting roller 62 stationary relative to the anvil roller 64, a pair of cam rollers (not shown) may press against a pair of rolling surfaces 84 defined on the rotary die cutting roller 62 outboard of the cutting surface 68. The pressing force of the cam rollers urges the rotary die cutting roller 62 against the anvil roller 64 and helps furnish the cutting surface 68 with a sufficient cutting pressure.

The locator punch assembly 54, which is positioned downstream from the rotary die cutting assembly 52, includes a locator plate 86 and a punch 88. The locator plate 86 is configured to locate the friction material segments 28 of each friction material segment set 72 at a break location; that is, at a location linearly displaced in the axial direction from the annular surface 20 of the core plate 12 which, as further explained below, is rotatably supported by the core plate indexing assembly 56. The punch 88 is configured to separate the friction material segments 28 from the friction material sheet 58 and place them onto the annular surface 20 of the core plate 12. The ties 76 that integrally connect the friction material segments 28 to the friction material sheet 58 help keep the friction material segments 28 properly spaced relative to one another for location and removal by the locator punch assembly 54. Removal of the friction material segments 28 from the friction material sheet 58 severs the ties 76 right at the edges 32 of the friction material segments 28. The locator punch assembly 54 may also include a cover (not shown) disposed over the locator plate 86 between the rotary die cutting assembly 52 and the punch 88 to keep the friction material sheet 58 from buckling away from the locator plate 86 upon conveyance from the rollers 62, 64.

The locator plate 86 may define a plurality of guide holes 90 (shown best in FIG. 4) that are sized and shaped to permit passage of the friction material segments 28 being cut into the advancing friction material sheet 58 when properly registered. The guide holes 90 may be aligned, on one side of the locator plate 86, with the punch 88 and, on the other side, with the annular surface 20 of the core plate 12 that is rotatably supported by the core plate indexing assembly 56. The number of guide holes 90 present may be selected to account for the number of friction material segments 28 contained in each friction material segment set 72. For example, referring back to FIG. 7 for the moment, if the rotary die cutting assembly 52 is configured to cut the depicted die line 700, then the locator plate 86 may define at least eight guide holes 90 sized, shaped, and oriented to permit the passage of the alternately-oriented triangular friction material segments 628 included in each friction material segment set 772 through the locator plate 86. To permit flexible use of locator punch assembly 54 with different patterns 70 of the friction material segments 28, including those shown in FIGS. 7 through 11, the locator plate 86 may be removably secured relative to the rotary die cutting assembly 52 and the core plate indexing assembly 56. This arrangement allows the appropriate locator plate 86 to be easily incorporated into the locator punch assembly 54 to match on the particular pattern 70 of friction material segments 28 being cut by the rotary die cutting assembly 52.

Figure 4:
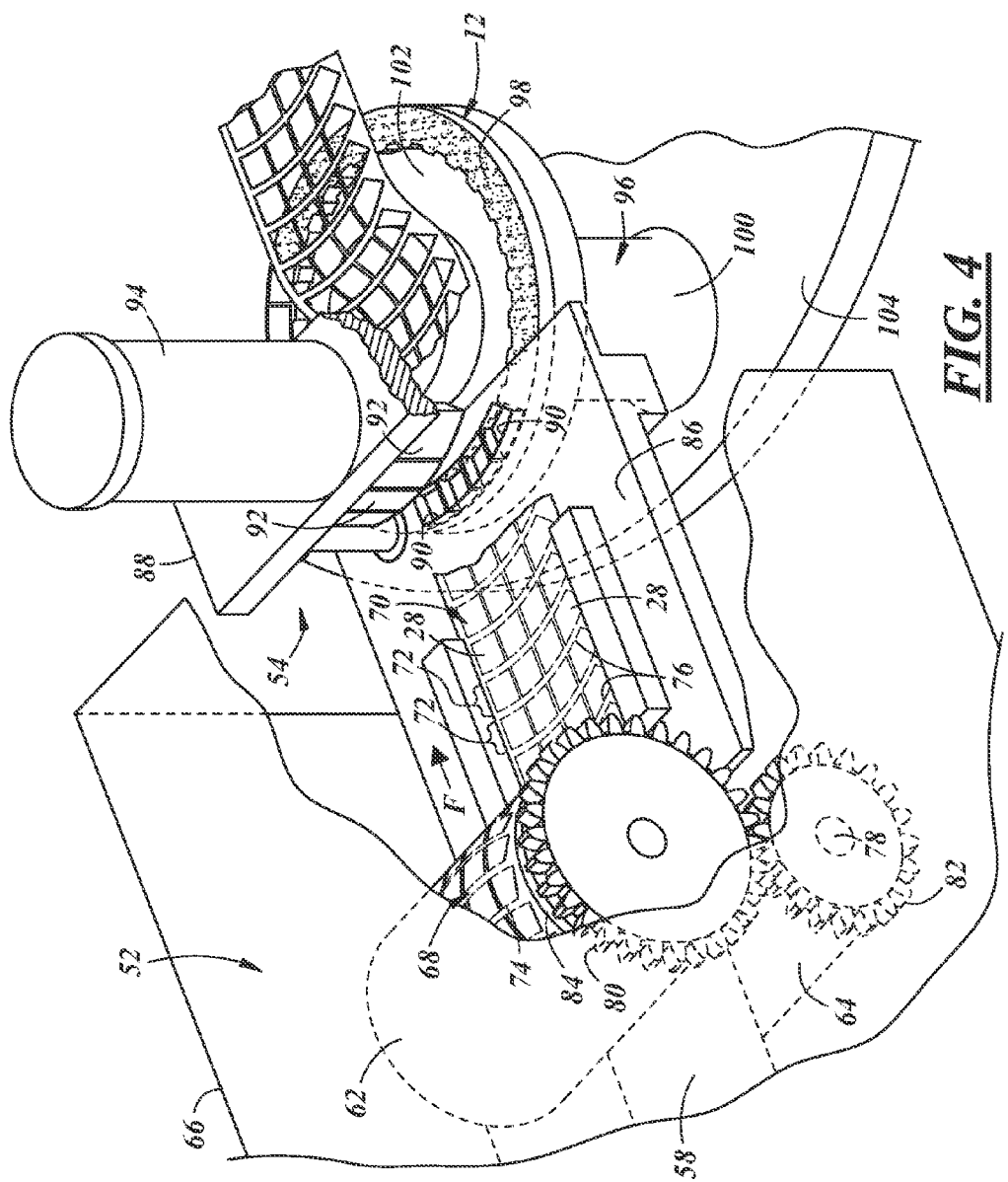
Figure 6:
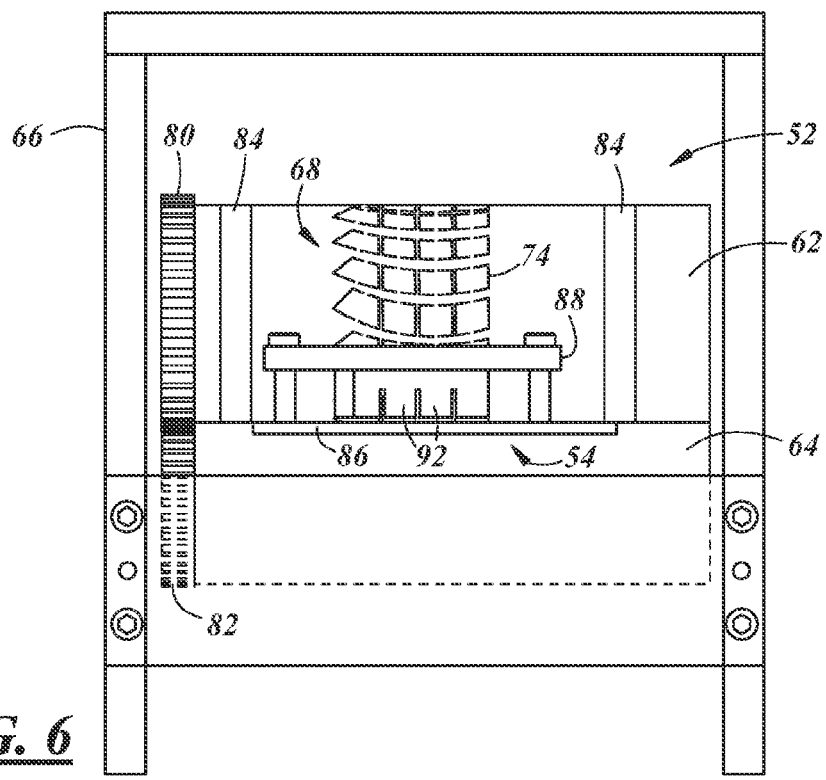

The punch 88 includes a plurality of punch rods 92 and a punch actuator 94 (shown best in FIG. 4). The punch rods 92 are aligned with the plurality of guide holes 90 in the locator plate 86 and are configured to push the friction material segments 28 of each the friction material segment set 72 through the guide holes 90 and sever the one or more ties 76. Such orchestrated activity of the punch rods 92 may be administered by the punch actuator 94 and any necessary auxiliary process control equipment. For example, the punch actuator 94, which may be electrically, pneumatically, or cam driven, may actuate the punch rods 92 from a rest position adjacent to the guide holes 90, as presently shown in FIG. 4, to an advanced position linearly displaced from the rest position and extending through the guide holes 90. The punch rods 92 may be returned to their rest position during reprieve from the linear actuation by a mechanical (i.e., springs) or electrical reverse force.

The number of punch rods 92 included in the punch 88 may be specifically chosen to match the number friction material segments 28 included in each friction material segment set 72 being cut and, consequently, the number of guide holes 90 defined in the particular locator plate 86 being used. The size and shape of the punch rods 92 may also be tailored to closely resemble the friction materials segments 28 yet still permit passage through the guide holes 90. In other instances, however, the size, shape, and number of punch rods 92 may be established to work robustly with several different patterns 70 of friction material segments 28. Differences in size and shape profiles of the friction material segments 28 may be overcome by a sufficiently generalized punch rod design while differences in the number of segments 28 in each friction material segment set 70 can be accommodated by the selective actuation of only some of the punch rods 92 at the break location.

The core plate indexing assembly 56 is positioned near the locator punch assembly 54 and includes a rotatable support device 96 that supports the core plate 12. The rotatable support device 96 is configured to situate a portion of the annular surface 20 of the core plate 12 into alignment with the break location and adjacent to the guide holes 90 defined in the locator plate 86. This allows the friction material segments 28 that are punched through the guide holes 90 to be placed onto the portion of the annular surface 20 positioned at the break location over a previously-applied bonding material 98. To accommodate placement of the friction material segments 28 annularly around the core plate 12 for eventual fabrication into the friction facing 14, the rotatable support device 96 may be configured to rotatably index a constant angular distance after each friction material segment set 72 is placed. A typical angular distance traversed during each indexing is between about 30° and about 90° with the specific angular distance depending on the number of friction material segment sets 72 required to form the friction facing 14. For example, if each friction material segment set 72 includes eight friction material segments 28, and the full friction facing 14 includes a total of sixty-four circumferentially spaced apart friction material segments 28, as is the case for the die line 700 shown in FIG. 7, then the rotatable support device 96 rotates 45° after each friction material segment set 72 is placed. The rotatable support device 96 employed to support the core plate 12 may be a rotatable platform 100, driven by a servo motor (not shown), that includes a round shelf 102 with surface features designed to fixedly hold the core plate 12 (the round shelf often being referred to as a bonding nest).

Figure 2:
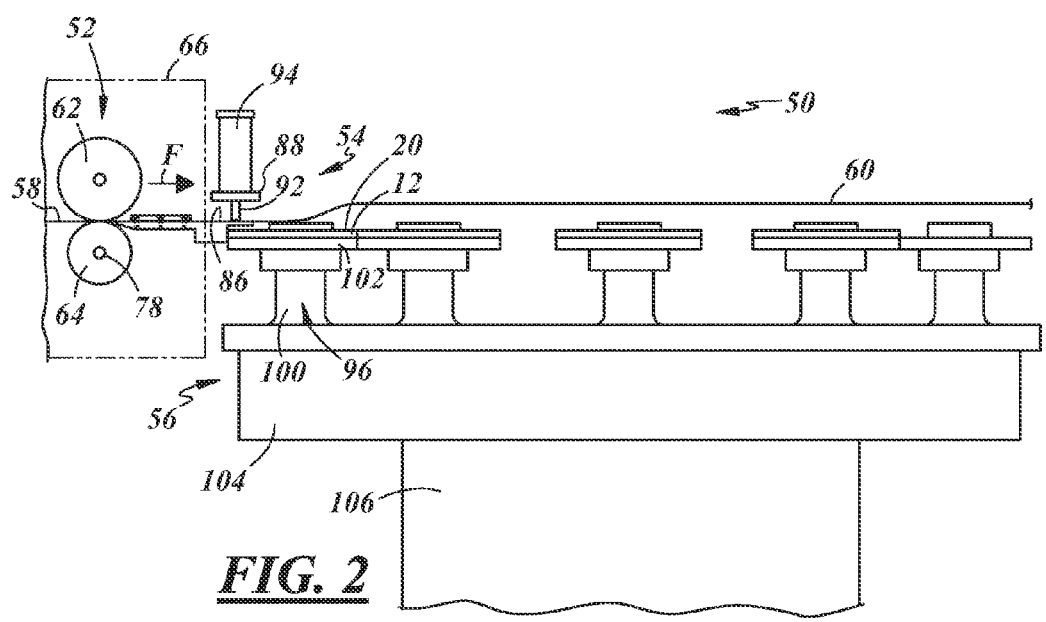
FIGS. 2-6 depict various views of an apparatus for making a friction plate.
Figure 3:
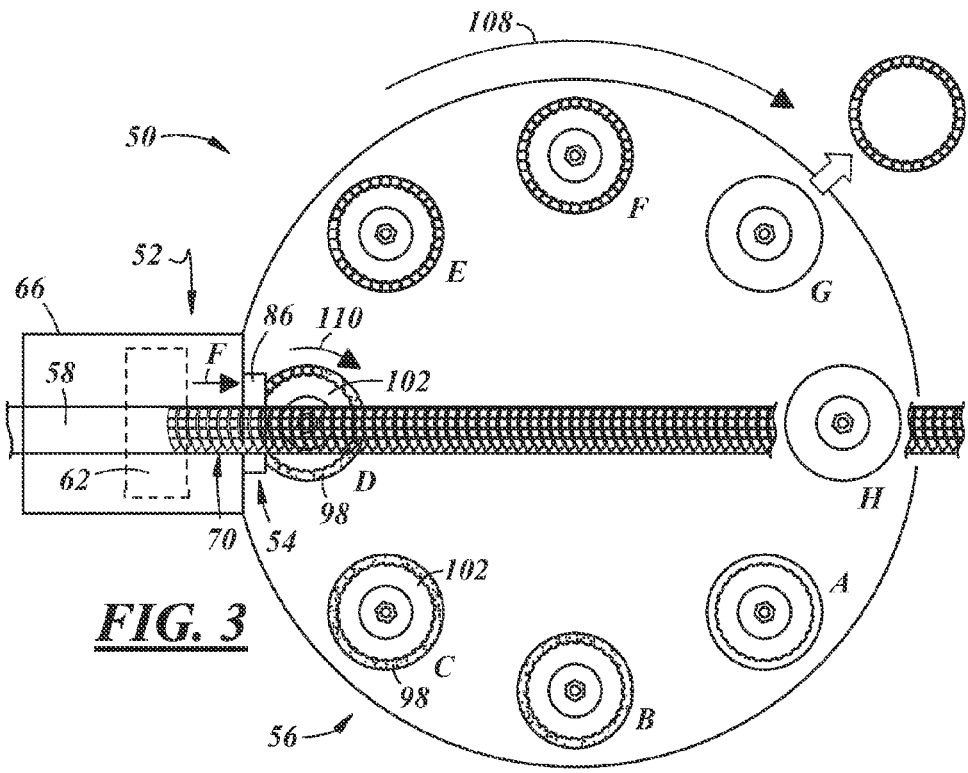
Figure 5:
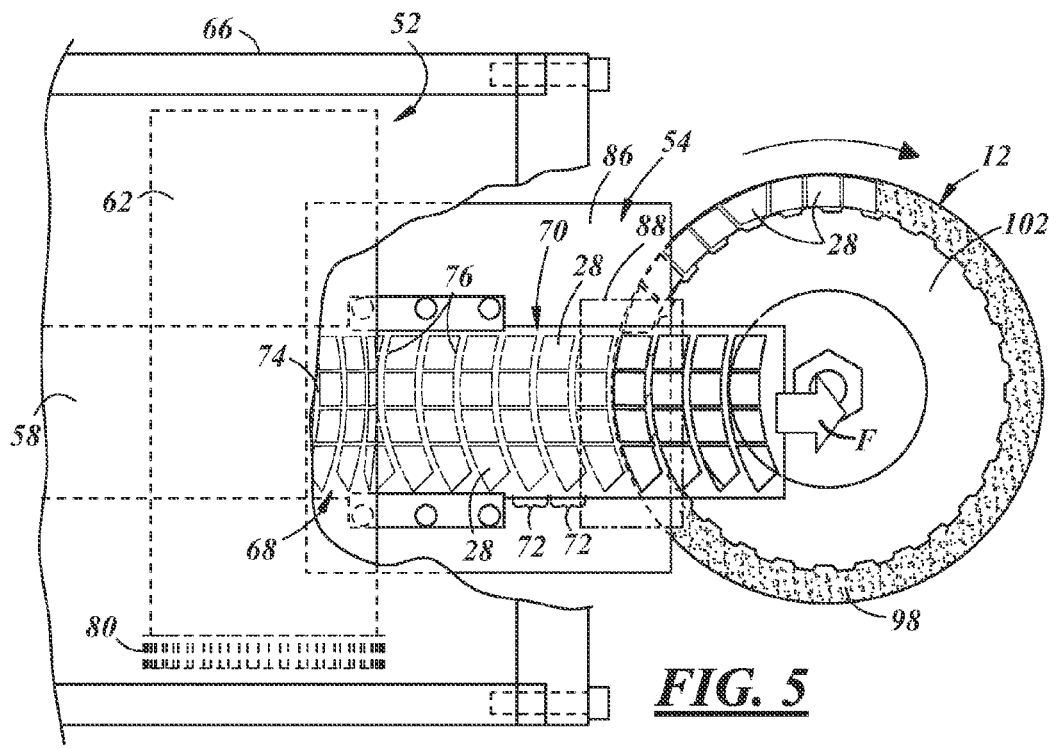

The core plate indexing assembly 56 may also include a table 104 that carries the rotatable support device 96. The table 104 may be mounted on a rotatable pedestal 106 operatively engaged with a motor (not shown) for selectively driving indexed rotation of the pedestal 106, and thus the table 104, at a desired speed and according to a desired indexing schedule. The term "indexed rotation" refers to the intermittent, partial rotation of the table 104 to progress the rotatable support device 96 through multiple stages in the manufacture of the friction plate 10, as further explained below. These stages may include loading of the core plate 12, application of the bonding material 98, placement of the friction material segments 28 at the locator punch assembly 54, inspection, curing, and any other stages that may be required. Multiple rotatable support devices 96 may be carried on the table 104 to facilitate the continuous production of the friction plate 10 while keeping each of the manufacturing stages constantly in service. Here, as shown in FIGS. 2 and 3, eight rotatable support devices 96 are carried by the table 104. But of course more or less of the rotatable support devices 96 may be carried depending on the manufacturing specifics related to how the friction plate 10 is made.

The apparatus 50 may be operated to make a multitude of the friction plates 10 in succession. To begin, at least in terms of describing the overall operation, the core plate 12 may be loaded onto the rotatable support device 96 of the core plate indexing assembly 56 at location A (loading stage). The pedestal 106 then rotates the table 104 clockwise as shown by arrow 108 and moves the rotatable support device 96 to position B which, here, is where the bonding material 98 is applied around the annular surface 20 of the core plate 12 (bonding material application stage). The bonding material 98 may be, as shown, a tacky uncured thermosetting resin film, such as that of a phenolic resin, or it may be some other bonding material arrangement. After the bonding material 98 is applied, the rotatable support device 96 is moved to location C following another indexed rotation of the table 104 to wait for the locator punch assembly 54 to become available (idle stage). Eventually, when the locator punch assembly 54 is ready, the table 104 is again rotated to bring the rotatable support device 96 to location D (friction material segments placement stage) and a portion of the annular surface 20 of the core plate 12 into alignment with the break location. The time taken to accomplish placement of the friction material segments 28 at location D usually determines when the table 104 is rotated and, consequently, when the rotatable support device 96 is moved between locations and how long the table 104 remains stationary between such indexed rotations.

At the same time the core plate 12 is advancing through locations A-D on the core plate indexing assembly 56, the friction material sheet 58 is being received in the rotary die cutting assembly 52. The friction material sheet 58 is passed through the rotary die cutting assembly 52 between the rotary die cutting roller 62 and the anvil roller 64 in the forward direction F while the two rollers 62, 64 are rotated in coordination by the shaft 78. This enables the cutting surface 68 to rotatably engage the friction material sheet 58 and cut the pattern 70 of the friction material segments 28 into the sheet 58. The friction material segments 28, as mentioned before, are not entirely severed from friction material sheet 58 but, instead, remain integrally connected to the sheet 58 by the one or more ties 76. Upon emergence from the rotary die cutting assembly 52, the friction material sheet 58 with the cut pattern 70 of friction material segments 28 is advanced toward the locator punch assembly 54. A servo motor operatively engaged with the shaft 78 that drives the anvil roller 64 advances the friction material sheet 58 towards the locator punch assembly 54 in defined increments to accurately register each friction material segment set 70, one after another, with the break location. The locator plate 86 may be covered along this stretch to help keep the friction material sheet 58 from buckling.

The friction material sheet 58 is brought to the locator punch assembly 54 by controlled coordinated rotation of the rollers 62, 64 of the rotary die cutting assembly 52. The friction material sheet 58 is advanced adjacent to the locator plate 86 so that the friction material segments 28 of the encroaching friction material segment set 70 are registered with the guide holes 90 defined in the locater plate 86. At the instant the friction material segment set 70 is properly registered, the rotary die cutting roller 62 and the anvil roller 64 stop rotating to momentarily cease advancement of the friction material sheet 58. The punch rods 92 are then actuated by the punch actuator 94. The actuation of the punch rods 92 drives them from their rest position through both the friction material sheet 58 and the guide holes 90 to their advanced position. This actuated movement of the punch rods 92 severs the friction material segments 28 from the friction material sheet 58 and presses them, over the bonding material 98, onto the annular surface 20 of the core plate 12 which, as previously mentioned, is located adjacent to the guide holes 90 in alignment with the break location on the rotatable support device 96 of the core plate indexing assembly 56.

The punch rods 92 are then retracted to their rest position and the friction material sheet 58 is advanced so that another friction material segment set 70 is brought into registry with the guide holes 90. At the same time, the rotatable support device 96 rotates clockwise a constant angular distance, as shown by arrow 110, to bring another portion of the annular surface 20 of the core plate 12 adjacent to the guide holes 90 and into alignment with the break location. The process of registering the available friction material segment set 70 with the guide holes 90, punching the friction material segments 28 through the friction material sheet 58 and the guide holes 90 with the punch 88, pressing the friction material segments 28 onto the annular surface 20 of the core plate 12, and rotating the core plate 12 a constant angular distance with the rotatable support device 96 is repeated until the core plate 12 completes one full rotation. The result is an annular arrangement of the friction material segments 28 preliminarily tack-bonded around the annular surface 20 of the core plate 12. Permanent bonding of the friction material segments 28 to derive the friction facing 14 is accomplished later when the bonding material 98 is thermally press-cured or cross-linked by some other appropriate curing approach.

After the friction material segments 28 are applied at the locator punch assembly 54, the table 104 is rotated and the rotatable support device 96 is moved to location E for inspection (inspection stage). The core plate 12 and the preliminarily tack-bonded friction material segments 28 may be inspected manually, by camera, or by automated optical inspection equipment. If the core plate 12 and the friction material segments 28 are acceptable, the core plate 12 is left on the rotatable support device 96, and it eventually arrives at location F following the next indexed rotation of the table 104. The rotatable support device 96 may sit idly at location F (another idle stage) or, alternatively, the friction material segments 28 may be thermally press-cured to the annular surface 20 of the core plate 12 by a hot platen press (curing stage) to derive the friction facing 14 through curing of the bonding material 98. The next indexed rotation of the table 104 brings the rotatable support device 96 to location G where the core plate 12 with the preliminarily tack-bonded friction material segments 28 (or the friction facing 14 if curing occurred at location F) is removed from the support device 96. Another indexed rotation of the table 104, and the final one in the cycle, moves the rotatable support device 96 to location H for inspection of the shelf 102 (another inspection stage). The shelf 102 is inspected here to verify its availability and make sure no damage has occurred during the previous progression through locations A to G. The next indexed rotation of the table 104 brings the rotatable support device 96 back to location A where another core plate 12 can be loaded.

Each of the eight rotatable support devices 96 included in the core plate indexing assembly 56 commutes through the same locations (A-H) in the same sequence. The rotary die cutting assembly 52 and the punch locater assembly 54 can cooperatively operate with the core plate indexing assembly 56 to quickly and accurately place the annular arrangement of the friction material segments 28 onto the annular surfaces 20 of the core plates 12 that are brought, one after another, to location D. The fact that each of locations A-H is in service at the same time permits the core plates 12 with the preliminarily tack-bonded friction material segments 28 (or the friction facing 14 if curing occurred at location F) to be efficiently and repeatedly fabricated in succession. After the core plates 12 are removed from location G, they can be flipped over and loaded back onto the rotatable support device 96 at location A to place another annular arrangement of the friction material segments 28 onto the opposite annular surface 22, if desired. The preliminarily tack-bonded friction material segments 28 present on one or both of the annular surfaces 20, 22 of the core plate 12 may, if curing does not occur at location F, be thermally press-cured apart from of the core plate indexing assembly 56 either together (i.e., after friction material segments 28 have been placed on both annular surfaces 20, 22) or separately (i.e., after friction material segments 28 have been placed on one annular surface 20 but before friction material segments have been placed on the opposite annular surface 22) to form the friction facing(s) 14.

The above description of illustrative exemplary embodiments is merely descriptive in nature and not intended to limit the scope of the claims that follow. Many variations can be incorporated into the apparatus 50 without changing its general construction or mode of operation. For example, each of the table 104 and the rotatable support device 96 can rotate counterclockwise, as opposed to clockwise, without impacting the function of the apparatus 50 or the structure of the friction plate 10. Also, as another example, the rotatable support device 96 may be carried along a linear path between locations A to H on a conveyor belt or other appropriate mechanism instead of the circular path navigated by the rotatable table 104. These and other design variations within the ability of skilled artisans, although not expressly described here, are nonetheless contemplated as alternative embodiments of the apparatus 50 shown in FIGS. 2-6 and described in the accompanying text.

The invention claimed is:

1. A method of making a friction plate comprising:
   (a) cutting a pattern of friction material segments into a friction material sheet traveling in a forward direction such that each friction material segment remains integrally connected to the friction material sheet by at least one tie;
   (b) locating a predetermined number of the friction material segments adjacent to a surface of a core plate to which a bonding material is present;
   (c) separating the predetermined number of friction material segments from the friction material sheet; and
   (d) placing the predetermined number of friction material segments onto the surface of the core plate over the bonding material.

2. The method set forth in claim 1, further comprising:
   (e) rotating the surface of the core plate; and
   (f) repeating acts (b)-(d) to place another predetermined number of friction material segments onto the surface of the core plate.

3. The method set forth in claim 2, further comprising:
   (g) repeating acts (e)-(f) until an annular arrangement of the friction material segments is placed around the surface of the core plate.

4. The method set forth in claim 1, wherein act (b) comprises:
   locating the friction material sheet adjacent a locator plate that includes a plurality of guide holes aligned with the surface of the core plate, each of the plurality of guide holes being sized to permit passage of a correspondingly located friction material segment; and
   registering the predetermined number of friction material segments with the plurality of guide holes.

5. The method set forth in claim 4, wherein act (c) comprises:
   punching the friction material segments through the plurality of guide holes and severing the friction material segments from their respective ties.

6. The method set forth in claim 5, wherein act (d) comprises:
   pressing the friction material segments onto the surface of the core plate over the bonding material.

7. A method of making a friction plate comprising:
   (a) receiving a friction material sheet in a rotary die cutting assembly that includes a rotary die cutting roller and an anvil roller, the rotary die cutting roller comprising a cutting surface configured to rotatably engage the friction material sheet;
   (b) passing the friction material sheet between the rotary die cutting roller and the anvil roller so that the cutting surface cuts a pattern of friction material segments into the friction material sheet such that each friction material segment remains connected to the friction material sheet by at least one tie, the pattern of friction material segments comprising a friction material segment set that includes a predetermined number of the friction material segments and which is repeatedly cut one after another;
   (c) bringing the friction material sheet to a locater punch assembly configured to locate one of the friction material segment sets at a break location and, once located, to separate the friction material segments of the friction material segment set from the friction material sheet at the break location;
   (d) supporting a core plate having an annular surface, which includes a bonding material, on a rotatable support device that positions a portion of the annular surface of the core plate adjacent to and in alignment with the break location; and
   (e) operating the rotary die cutting assembly, the locator punch assembly, and the rotatable support device to successively place a plurality of the friction material segment sets onto the annular surface of the core plate over the bonding material during one full rotation of the core plate by the rotatable support device.

8. The method set forth in claim 7, wherein act (c) comprises:
   locating the friction material sheet adjacent to a locator plate that includes a plurality of guide holes at the break location, the guide holes being aligned with the annular surface of the core plate and being sized to permit passage of a correspondingly located friction material segment of the friction material segment set; and
   registering the friction material segments included in the friction material set with the plurality of guide holes.

9. The method set forth in claim 8, wherein act (e) comprises:
   punching the friction material segments of each of the plurality of friction material segment sets through the guide holes of the locater plate and severing the friction material segments from their respective ties;
   pressing the friction material segments of each of the plurality of friction material segment sets onto the annular surface of the core plate over the bonding material; and
   rotating the rotatable device a constant indexed distance after each of the plurality of friction material segment sets is placed.

10. The method set forth in claim 7, further comprising:
    carrying the rotatable support device on a rotatable table; and
    rotating the table to move the rotatable support device to and from the locator punch assembly.

11. An apparatus for making a friction plate comprising:
    a rotary die cutting assembly that includes a rotary die cutting roller and an anvil roller, the rotary die cutting roller comprising a cutting surface that, during cooperative rotation of the rotary die cutting roller and the anvil roller, cuts a pattern of friction material segments into a friction material sheet as the friction material sheet passes between the rotary die cutting roller and the anvil roller, the pattern of friction material segments comprising a plurality of friction material segment sets each of which includes a predetermined number of the friction material segments, the cutting surface being configured so that each of the friction material segments remains integrally connected to the friction material sheet by at least one tie;

a locator punch assembly configured to locate one of the friction material segment sets at a break location and to punch the friction material segments of the friction material segment set through the friction material sheet at the break location; and a core plate indexing assembly that supports a core plate having a surface, to which a bonding material is present, on a rotatable support device that situates a portion of the surface of the core plate into alignment with the break location so that the friction material segments punched through the friction material sheet by the locator punch assembly are placed onto the portion of the surface of the core plate over the bonding material.

12. The apparatus set forth in claim 11, wherein the locator punch assembly comprises:

a locator plate having a plurality of guide holes, each of the plurality of guide holes being sized to permit passage of a correspondingly located friction material segment of the friction material segment set; and a punch that includes a plurality of punch rods configured to, when actuated, punch the friction material segments of the friction material segment set through the guide holes and press the friction material segments onto the portion of the surface of the core plate at the break location.

13. The apparatus set forth in claim 11, wherein the rotatable support device is configured to rotatably index a constant angular distance after the friction material segments of the friction material segment set are placed onto the portion of the surface of the core plate at the break location.

14. The apparatus set forth in claim 13, wherein the constant angular distance is between about 30° and about 90°.

15. The apparatus set forth in claim 13, wherein the core plate indexing assembly further comprises a rotatable table that supports the rotatable support device.

* * * * *